(12) United States Patent
Lin

(10) Patent No.: US 6,220,801 B1
(45) Date of Patent: Apr. 24, 2001

(54) FREE-RUNNING-ON, LOCKING-OFF AND TENSION DIRECTLY INDICATED LOCKING NUT (FROLO & TDI LOCKING NUT)

(76) Inventor: Chung-I Lin, P.O. Box 82-144, Taipei (TW)

(*) Notice: Subject to any disclaimer, the term of this patent is extended or adjusted under 35 U.S.C. 154(b) by 0 days.

(21) Appl. No.: 09/241,425

(22) Filed: Feb. 2, 1999

(51) Int. Cl.[7] .............................. F16B 31/02; F16B 37/08; F16B 39/22
(52) U.S. Cl. ................ 411/9; 411/278; 411/432; 411/533
(58) Field of Search ................... 411/237, 267, 411/270, 578, 432, 433, 8, 9, 10, 533

(56) References Cited

U.S. PATENT DOCUMENTS

| | | | |
|---|---|---|---|
| 1,969,223 | * | 8/1934 | Kotvis et al. ............ 411/278 |
| 4,717,299 | * | 1/1988 | Underwood .............. 411/533 X |
| 4,971,498 | * | 11/1990 | Goforthe ................. 411/533 X |

FOREIGN PATENT DOCUMENTS

2051285 * 1/1981 (GB) ................................ 411/533

* cited by examiner

*Primary Examiner*—Niell Wilson
(74) *Attorney, Agent, or Firm*—Dougherty & Troxell

(57) ABSTRACT

A free-running-on, locking-off and tension directly indicated locking nut, capable of indicating whether the locking nut is suitably tightened with the required axial tension and preventing the locking nut from becoming loose, includes a body portion formed with a base and a conical seat portion extending upwardly from a central portion of a top of the base, the seat portion having an upper end formed with a vertical outer wall surface, the body portion having an axial hole extending through the body portion and provided with internal threads, and a cap having an axial through taper hole which is smaller than the concial seat portion in height. The axial through taper hole is formed with a conical surface with a large diameter at a bottom thereof, a neck with a vertical surface extending upwardly from a top of the conical surface, and a chamfer extending upwardly outwardly from a top of the neck to form a countersink, the conical surface being configured to fit over the conical seat portion. The locking nut can engage a bolt at zero loading resistance, automatically produce loose resistant torque when fastened on a workpiece, and indicate whether the locking nut is fastened with the required axial tension by showing the change in the clearance between the body portion and the cap.

3 Claims, 5 Drawing Sheets

FREE-RUNNING-ON, LOCKING-OFF AND TENSION DIRECTLY INDICATED LOCKING NUT (FROLO & TDI LOCKING NUT)

BACKGROUND OF THE INVENTION

1. Field of the Invention

This invention is related to a free-running-on, locking-off and tension directly indicated locking nut, which engages with a bolt with zero loading resistance, automatically produces loose resistant torque when fastened on a workpiece, and indicates whether the locking nut is fastened with the required axial tension by showing the change in the clearance between the body portion and the cap.

2. Description of the Prior Art

It has been found that the fastener composed of nut and bolt is an important element for the assembly of an object. The fastener is applicable in many fields, such as the steel structure of a building and even an household apparatus, and is an inevitable element for the engagement between workpieces or assembly of machine platforms. However, the engagement of the conventional nut and bolt will become loose or even disengaged when subjected to external force or other factors. Hence, it has been proposed to mount a packing between the nut and the workpiece in order to prevent this drawback. This is the best method for a static workpiece which might be dismantled in the future or which is a lightweight static member. Nevertheless, this method is not applicable to dynamic machines as the engagement between the nut and bolt will become loose when subjected to longtermed vibration. Similarly, this method is not applicable to the workpiece which will not be dismantled once secured. Thus, it has been proposed to insert fit a nylon member on the internal threads of the nut so as to strenghen the engagement between the nut and bolt. Nevertheless, this expedient is not applicable to a workpiece which is subjected to high temperature, acid or alkaline circumstance, as nylon will be melted at high temperature and dissolved in acid or alkaline circumstance, thereby rendering this expedient useless to strengthen the engagement between nuts and bolts. Furthermore, an expensive tension measuring device must be used in order to measure the tension required for locking the nut.

Therefore, it is an object of the present invention to provide a free-running-on, locking-off and tension directly indicated locking nut which can obviate and mitigate the above-mentioned drawbacks.

SUMMARY OF THE INVENTION

This invention is related to a free-running-on, locking-off and tension directly indicated locking nut.

According to a preferred embodiment of the present invention, a free-running-on, locking off and tension directly indicated locking nut, includes a body portion formed with a base and a conical seat portion extending upwardly from a central portion of a top of the base, the seat portion having an upper end formed with a vertical outer wall surface, the body portion having an axial hole extending through the body portion and provided with internal threads, and a cap having an axial through taper hole which is smaller than the conical seat portion in height, the axial through taper hole being formed with a conical surface with a large diameter at a bottom thereof, a neck with a vertical surface extending upwardly from a top of the conical surface, and a chamfer extending upwardly outwardly from a top of the neck to form a countersink, the conical surface being configured to fit over the conical seat portion.

It is the primary object of the present invention to provide a free-running-on, locking-off and tension directly indicated locking nut, which can engage with a bolt at zero loading resistance, automatically produce loose resistant torque when fastened on a workpiece, and indicate whether the locking nut is fastened with the required axial tension by showing the change in the clearance between the body portion and the cap.

It is another object of the present invention to provide a free-running-on, locking-off and tension directly indicated locking nut, which is smooth, convenient and safe in operation and can be produced at low cost.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
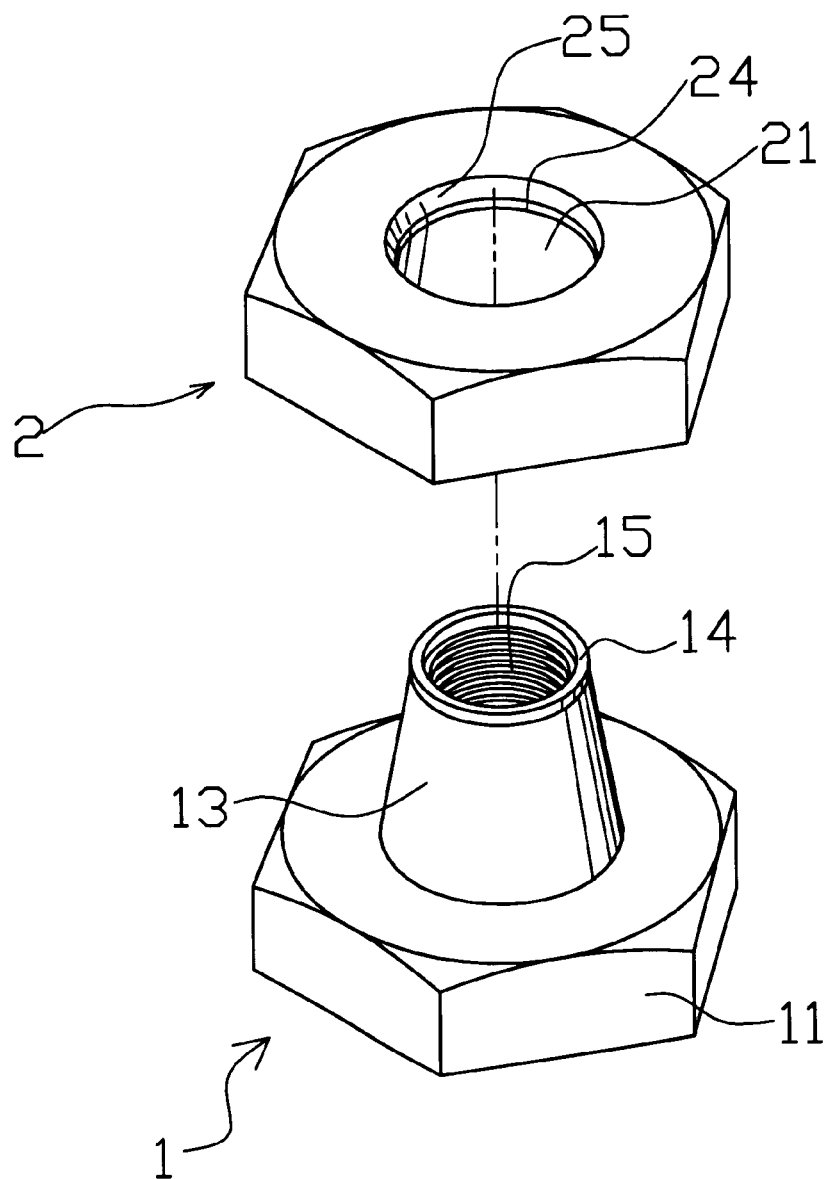
FIG. 1 an exploded perspective view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
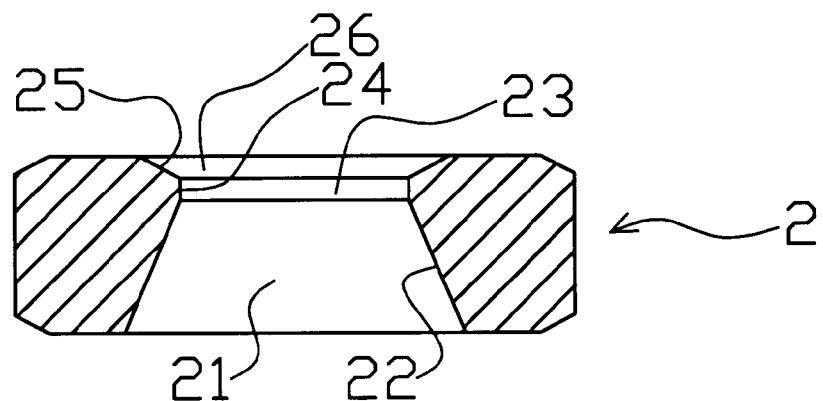
FIG. 2 is an exploded sectional view of the present invention.
Figure 2:
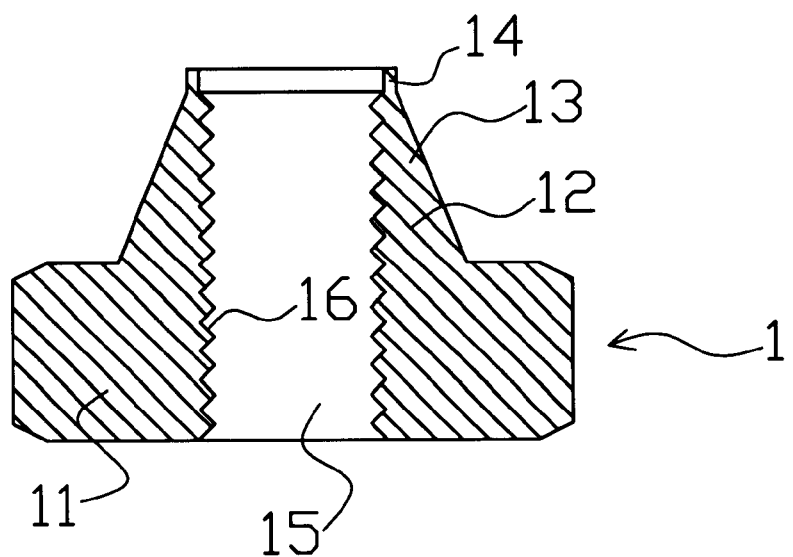

With reference to the drawings and in particular to FIGS. 1 and 2 thereof, the present invention generally a body portion 1 and a cap 2. The body portion 1 is formed with a base 11 (which may be in any shape) and a conical seat portion 12 extending upwardly from the central portion of the top of the base 11. The upper end 14 of the conical seat portion 12 is formed with a vertical outer surface. The body portion 1 has an axial hole 15 extending through the body portion 1 and provided with internal threads 16. The cap 2 may be in any shape and has an axial through taper hole 21 which is smaller than the concial seat portion 12 in height. The axial through taper hole 21 is formed with a conical surface 22 with the large diameter at the bottom, a neck 23 with a vertical surface extending upwardly from a top of the conical surface 22, and a chamfer 25 extending upwardly outwardly from a top of the neck 23 to form a countersink 26. The conical surface 22 is configured to fit over the conical seat portion 12.

Figure 3:
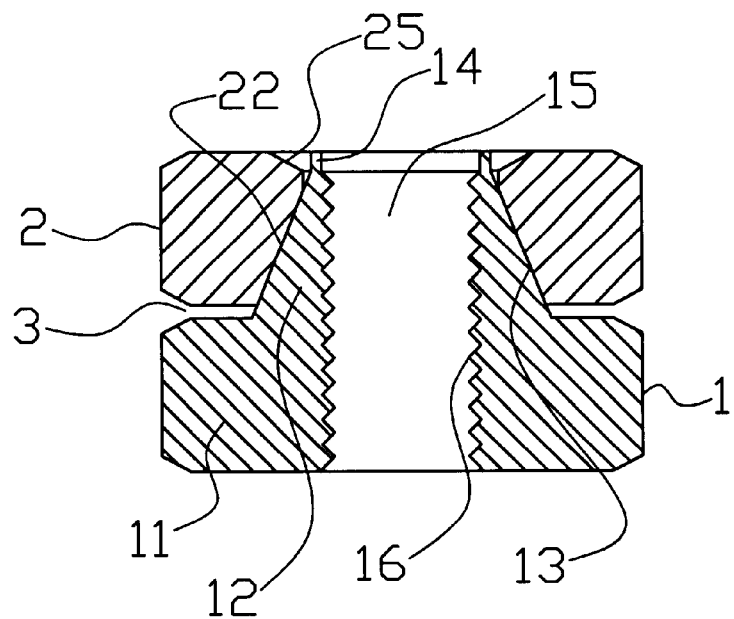
FIG. 3 is a sectional view illustrating the engagement of the cap and the body portion.
Figure 4:
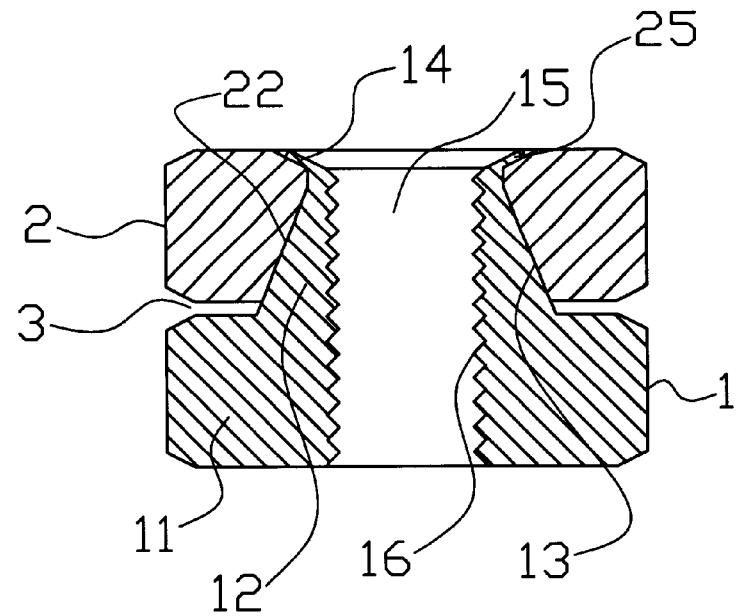
FIG. 4 is a sectional view illustrating how the cap is rotatably fastened on the body portion.

Referring to FIGS. 3 and 4, the cap 2 is riveted on the body portion 1, with the axial through taper hole 21 of the former fitted over the conical seat portion 12 of the latter, thereby causing the upper end 14 of the latter to protrude out of the neck 23 of the former. Then, the upper end 14 of the body portion 1 is expanded outwardly by a press (not shown) to prevent the cap 2 from disengaging from the body portion 1. However, the cap 2 may be rotated with respect to the body portion 1 (see FIG. 4). In addition, there is a clearance 3 between the body portion 1 and the cap 2.

Figure 5:
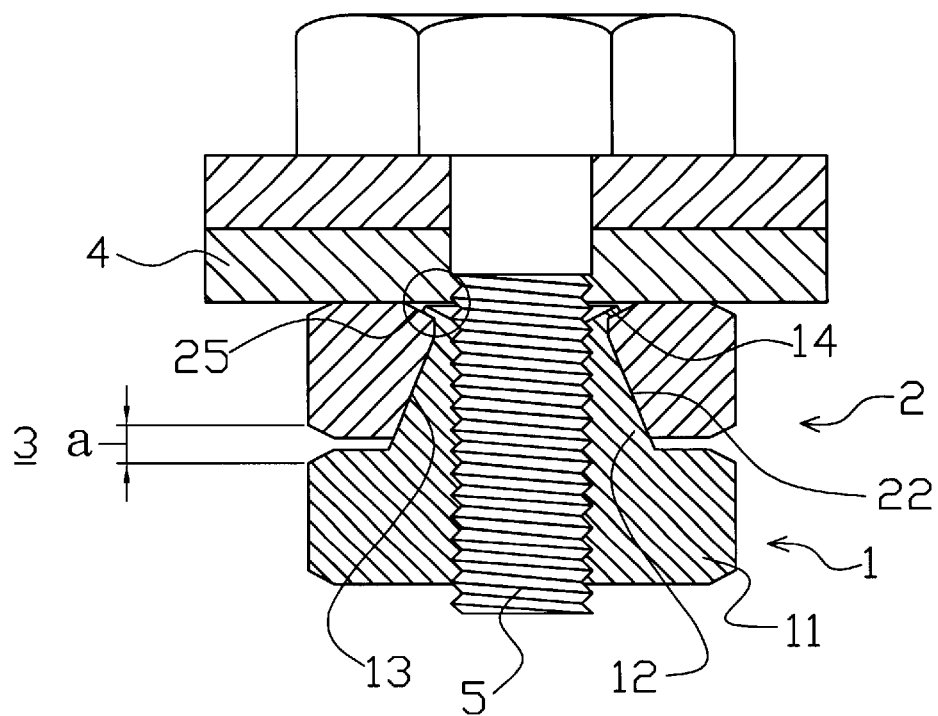
FIG. 5 is a sectional view illustrating how the locking nut is engaged with a workpiece.
Figure 6:
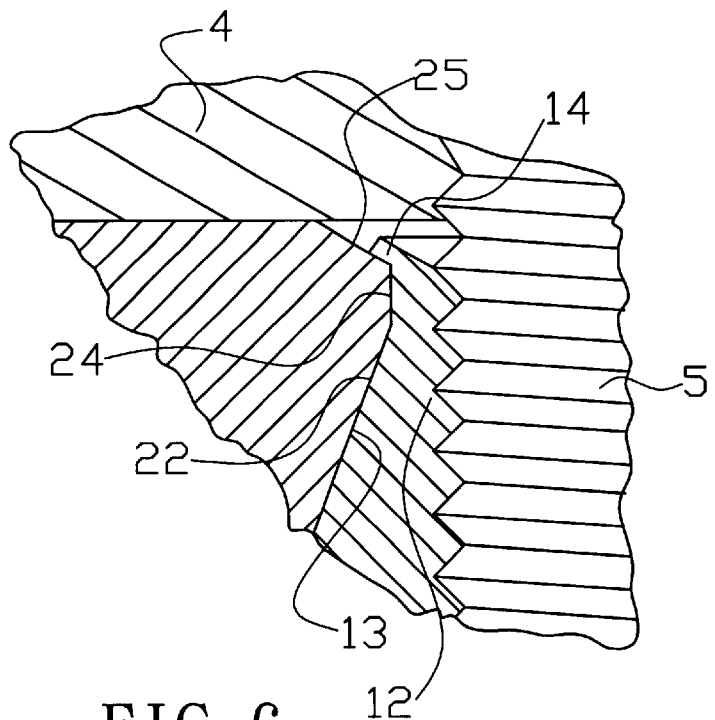
FIG. 6 is an enlarged fragmentary view of FIG. 5.
Figure 7:
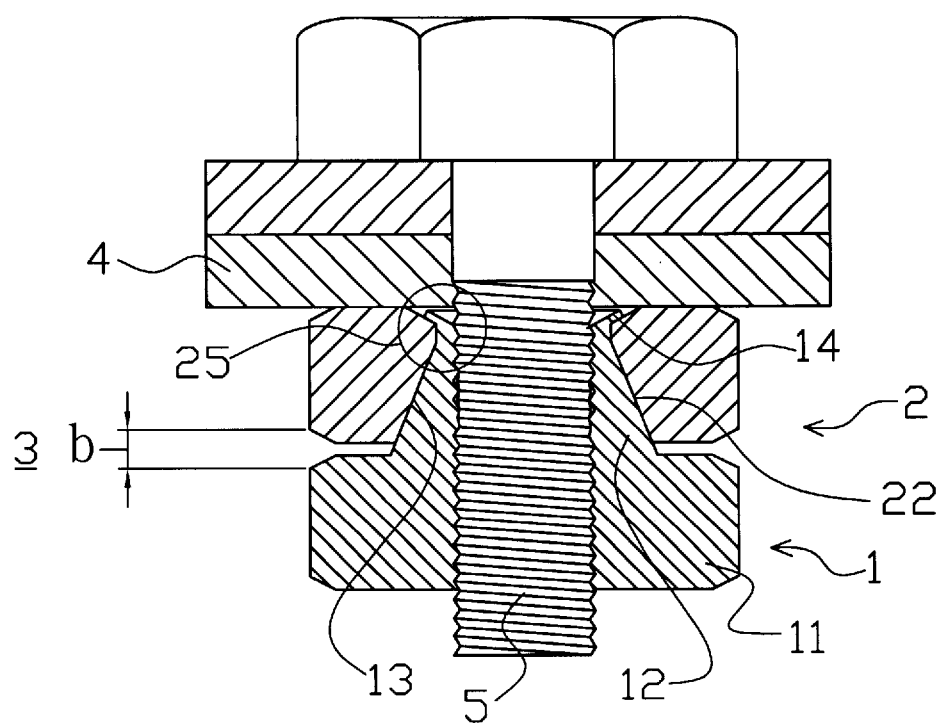
FIG. 7 is a sectional view illustrating how the locking nut is fastened on the workpiece.
Figure 8:
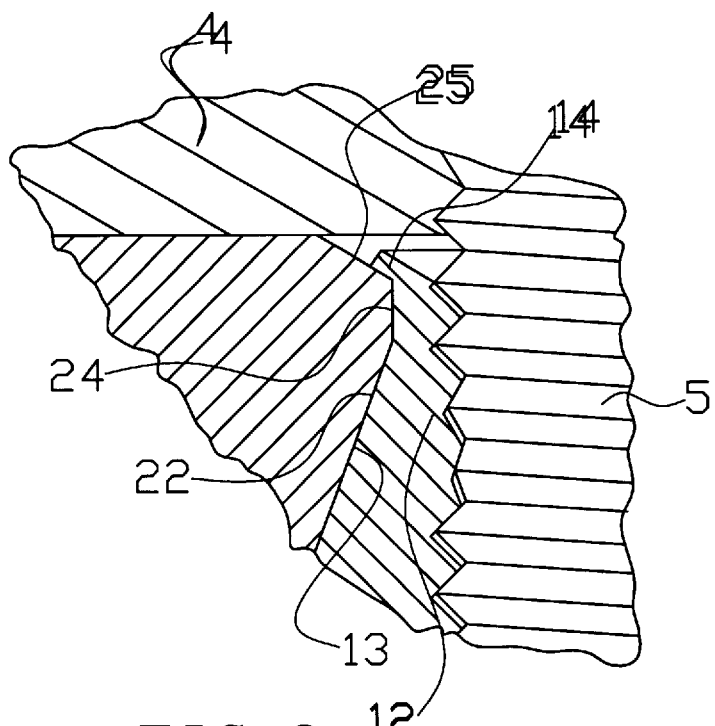
FIG. 8 is an enlarged fragmentary view of FIG. 7.

As shown in FIGS. 5 and 6, when in use, the body portion 1 together with the cap 2 is first turned on a bolt 5 until the cap is in contact with a workpiece 4. Then, the body portion 1 is further turned suitably tight on the workpiece 4. As the body portion 1 is forced through the axial through taper hole 21 of the cap 2, the mechanism of the conical surface 22 and the neck 23 will cause deformation to the upper end 14 of the conical seat portion 12 of the body portion 1 thereby deforming the internal threads 16 of the axial hole 15 and therefore interlocking the workpiece 4 with the present invention. As a consequence, the locking nut according to the present invention can be prevented from being loosened (see FIGS. 7 and 8). Furthermore, the clearance 3 will be changed from distance (a) to distance (b). As shown in FIGS. 5 and 7, the distance (b) is less than the distance (a), so that the user may measure the distance of the clearance with his or her eyes so as to control the desired tightness (tension).

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A locking and tightness indicating locking nut assembly comprising:
    a) a body portion having a base, a seat extending outwardly from a side of the base and having a conical outer surface decreasing in cross-section in a direction away from the base and an upper end, and a threaded hole extending through the base and the seat for engagement with a threaded member;
    b) a cap having a tapered hole extending partially through a thickness thereof, the tapered hole bounded by a conical inner surface in contact with the conical outer surface of the seat, the cap also having an annular surface extending from an inner end of the tapered hole and a chamfer extending from the annular surface, whereby the upper end engages the chamfer to attach the cap to the body portion such that the cap and body portion are rotatable relative to each other;
    c) a first surface on the base portion; and,
    d) a second surface on the cap facing toward the first surface, the first and second surfaces being spaced apart so as to form a tightness indicating clearance therebetween.

2. The locking and tightness indicating locking nut assembly of claim 2 wherein the base has a hexagonally shaped periphery.

3. The locking and tightness indicating locking nut assembly of claim 2 wherein the cap has a hexagonally shaped periphery.

\* \* \* \* \*